United States Patent
Lommen et al.

(10) Patent No.: US 8,044,859 B2
(45) Date of Patent: Oct. 25, 2011

(54) REFERENCE BEACON METHODS AND APPARATUS FOR TDOA/FDOA GEOLOCATION

(75) Inventors: Layne D. Lommen, Auburn, WA (US); Henry E. Halladay, Bellevue, WA (US); David O. Edewaard, Oakton, VA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/534,372

(22) Filed: Aug. 3, 2009

(65) Prior Publication Data

US 2009/0289851 A1 Nov. 26, 2009

Related U.S. Application Data

(63) Continuation of application No. 11/279,012, filed on Apr. 7, 2006, now Pat. No. 7,570,212.

(51) Int. Cl.
G01S 3/02 (2006.01)
(52) U.S. Cl. ...................................................... 342/465
(58) Field of Classification Search ............. 342/357.01–357.17, 385–386, 342/357.2–357.78, 463–465
See application file for complete search history.

(56) References Cited

U.S. PATENT DOCUMENTS

| | | | |
|---|---|---|---|
| 4,740,792 A | 4/1988 | Sagey et al. | |
| 5,008,679 A | 4/1991 | Effland et al. | |
| 5,327,144 A | 7/1994 | Stilp et al. | |
| 5,608,410 A | 3/1997 | Stilp et al. | |
| 5,999,116 A | 12/1999 | Evers | |
| 6,211,811 B1 | 4/2001 | Evers | |
| 6,230,018 B1 | 5/2001 | Watters et al. | |
| 6,330,452 B1 * | 12/2001 | Fattouche et al. | 455/456.1 |
| 6,522,296 B2 * | 2/2003 | Holt | 342/453 |
| 7,030,812 B2 * | 4/2006 | Bekritsky et al. | 342/387 |
| 7,090,812 B2 * | 8/2006 | Joyce et al. | 423/242.2 |
| 7,570,212 B2 * | 8/2009 | Lommen et al. | 342/386 |
| 2002/0196186 A1 | 12/2002 | Holt | |
| 2003/0017832 A1 | 1/2003 | Anderson et al. | |
| 2003/0052821 A1 | 3/2003 | Holt | |
| 2007/0216540 A1 * | 9/2007 | Riley et al. | 340/903 |

OTHER PUBLICATIONS

Don R. Van Rheeden et al., "Automatic Positioning of UAVs to Optimize TDOA Geolocation Performance," IEEE 2004.
Paul C. Chestnut, "Emitter Location Accuracy Using TDOA and Differential Doppler," IEEE Trans. on Aerospace and Electronic Systems, vol AES-18, No. 2, Mar. 1982.

(Continued)

*Primary Examiner* — Thomas Tarcza
*Assistant Examiner* — Nga X Nguyen
(74) *Attorney, Agent, or Firm* — Caven & Aghevli LLC

(57) ABSTRACT

A method and apparatus for estimating bias errors in a time-difference-of-arrival/frequency-difference-of-arrival (TDOA/FDOA) geolocation system using a reference signal transmitter in which position and/or motion information of the reference signal transmitter is encoded into the reference signal. The motion information may include the velocity and/or acceleration of the reference signal transmitter. The reference signal is received by multiple collection platforms operating in conjunction with a geolocation system and a reference correction processing system. The reference correction processing system receives, via the multiple collection platforms, the position and/or motion information, which is immediately and unambiguously associated with specific reference signal transmissions. The geolocation system estimates the position and/or velocity of the reference signal transmitter using conventional TDOA/FDOA techniques. The estimated position and/or velocity of the reference signal transmitter is compared to the information contained in the reference signal to estimate bias errors.

37 Claims, 3 Drawing Sheets

OTHER PUBLICATIONS

William W. Smith, Jr. et al., "Time Delay Techniques for Satellite Interference Location System," IEEE Trans. on Aerospace and Electronic Systems, vol. AES-25, No. 2, Mar. 1989.

William W. Smith, Jr. et al., "A Satellite Interference Location System Using Differential Time and Phase Measurement Techniques," IEEE AES Systems Magazine, Mar. 1991.

Alexander Sonnenschein et al., "Geolocation of Frequency-Hopping Transmitters via Satellite," IEEE Trans. on Aerospace and Electronic Systems, vol. AES-29, No. 4, Oct. 1993.

K.C. Ho et al., "Solution and Performance Analysis of Geolocation by TDOA," IEEE Trans. on Aerospace and Electronic Systems, vol. AES-29, No. 4, Oct. 1993.

* cited by examiner

REFERENCE BEACON METHODS AND APPARATUS FOR TDOA/FDOA GEOLOCATION

RELATED PATENT APPLICATIONS

This application claims the benefit under 35 U.S.C. §119 of U.S. patent application Ser. No. 11/279,012, which was filed on Apr. 7, 2006 and which issued as U.S. Pat. No. 7,570,212 on Aug. 4, 2009.

FIELD OF THE INVENTION

The present invention relates to time-difference-of-arrival (TDOA) and frequency-difference-of-arrival (FDOA) measurement techniques and systems.

BACKGROUND INFORMATION

Errors in time-difference-of-arrival (TDOA) and frequency-difference-of-arrival (FDOA) measurements used to perform geolocation of non-cooperative emitters (i.e., signals of unknown format or content, transmitted from an unknown location) can be reduced by use of a reference beacon that transmits a signal from a known position. By performing a reverse geolocation using signals transmitted from a reference beacon with a known position and velocity, it is possible to estimate bias errors in the TDOA/FDOA measurements taken by the collection system. The estimated bias errors can then be subtracted from measurements taken of non-cooperative emitter signals to reduce the bias error in those measurements. Such correction is typically performed by a reference correction processing system that is part of or operates in conjunction with the geolocation system.

In order to correctly compute the bias errors using signal data collected from a reference beacon transmitter, it is necessary to know the position (and/or velocity) of the transmitter at the time of transmission.

A reference beacon signal need not contain any information in order to provide useable bias corrections. A random or pseudorandom waveform with good correlation properties can be used as a reference beacon signal. In fact, it is generally simpler to generate a signal containing a pseudorandom waveform, than one which contains information.

Currently deployed reference beacon systems typically use stationary reference beacon transmitters whose locations are constant and known to geolocation processing systems, which compute the TDOA/FDOA bias error corrections based on the reference beacon signals and the locations of the transmitters. The beacon signals transmitted by these transmitters typically consist of pseudorandom waveforms, which contain no data.

The Boeing Company is currently developing a reference beacon system that can be placed on a moving platform (e.g., an aircraft). In such an arrangement, the position of the reference beacon transmitter is provided to the geolocation processing system over a network connection. This approach, however, requires the geolocation processing system to associate sets of position data received over the network from the reference beacon transmitter with sets of RF signal data independently received from one or more collection platforms. This association is accomplished by having the geolocation processing system command the reference beacon to transmit at a known time. In the aforementioned system, the reference beacon transmits its position data over the network at the time it starts transmission of the reference beacon signal. As with other conventional approaches, the reference beacon signals consist of pseudorandom waveforms.

SUMMARY OF THE INVENTION

The present invention is directed to a method and apparatus for estimating bias errors in a TDOA/FDOA system using a reference beacon signal in which position and/or motion information relating to the reference beacon transmitter is encoded. The motion information may include the velocity and/or acceleration of the reference beacon signal transmitter. The reference signal is received by one or more collection platforms operating in conjunction with a reference correction processing system. The reference correction processing system receives, via the one or more collection platforms, the position and/or motion information, which is immediately and unambiguously associated with specific reference signal transmissions.

Moreover, any separate data path from the reference signal transmitter to the reference correction processing system can be eliminated.

The aforementioned and additional features and advantages of the present invention are further described below.

DETAILED DESCRIPTION

Figure 1:
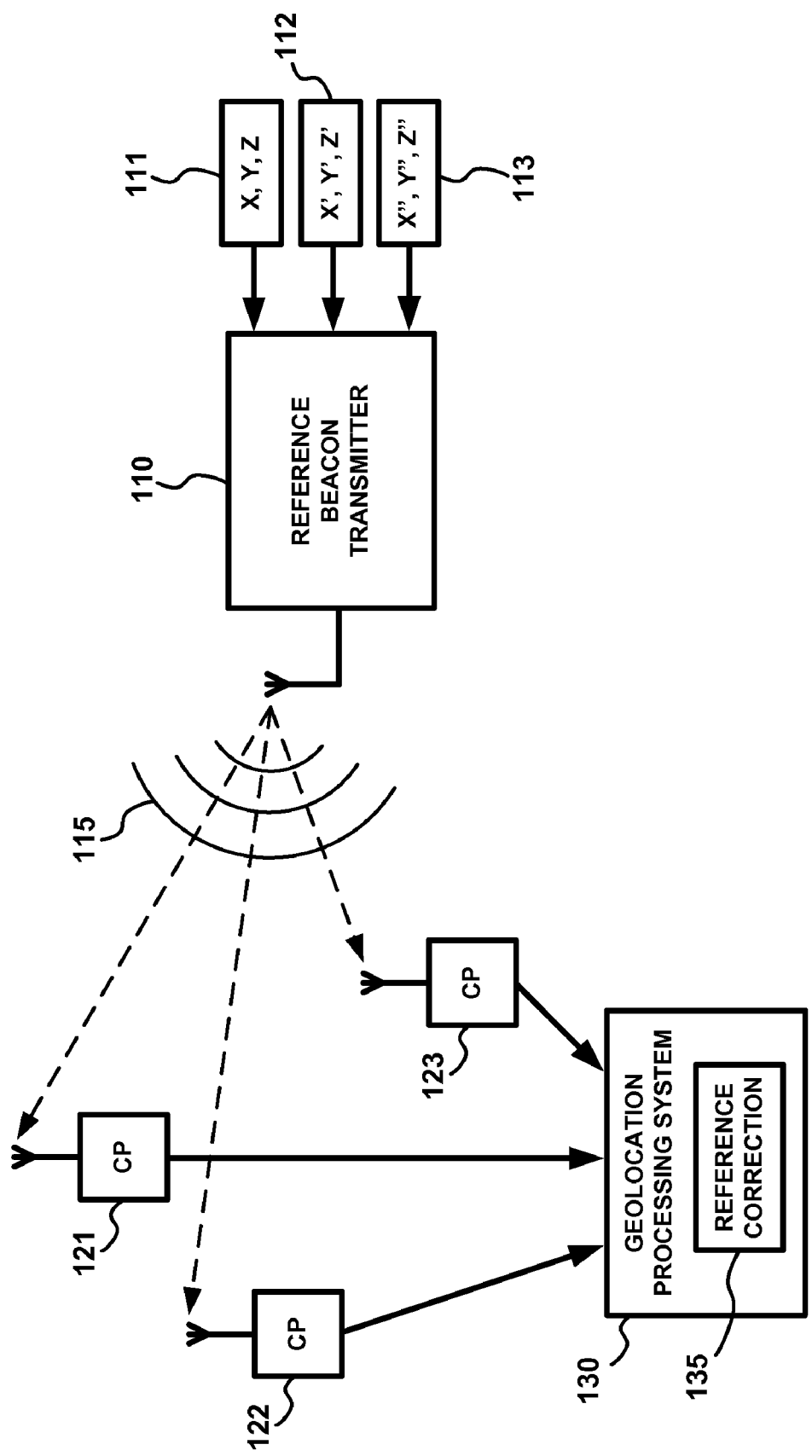
FIG. 1 is a block diagram of an exemplary embodiment of a reference beacon parameter information arrangement in accordance with the present invention.

FIG. 1 shows a block diagram of an exemplary embodiment of a bias error estimation arrangement for TDOA/FDOA, in accordance with the present invention. The arrangement of FIG. 1 includes a reference beacon transmitter 110 which transmits a reference beacon signal 115. It is contemplated that the position and/or velocity of the reference beacon transmitter 110 can vary with time (e.g., the transmitter 110 is carried in a moving aircraft), although the present invention will also operate with stationary transmitters. In the exemplary embodiment shown, position, velocity and acceleration information relating to the reference beacon transmitter 110 are provided to the transmitter 110 in known ways from elements 111, 112, and 113, respectively. The operation and implementation of the elements 111-113 are conventional and may include, for example, sensors, transducers, accelerometers, or the like. Moreover, as can be appreciated, even though illustrated as three separate blocks, elements 111-113 may be implemented as one or more units. As will be clear from the description below, the methods and systems of the present invention can be implemented to use only position information, position and velocity information, or position, velocity and acceleration information.

In accordance with the present invention, the reference beacon transmitter 110 periodically constructs a message containing information relating to the position of the reference beacon transmitter 110 at a specific time. The message is contained, as described in greater detail below, in the reference beacon signal 115 that is transmitted. Messages can be generated and transmitted periodically at a fixed time interval, for example, or in accordance with changes in the position of the transmitter 110. A particular message may also be transmitted more than once.

In an exemplary embodiment, the information contained in the message includes an estimate of the position of the reference beacon transmitter 110 at the time of transmission of the message. The message may include additional information, such as the velocity of the reference beacon transmitter 110 at the time of message transmission. In alternative embodiments, the message may include the position and/or velocity of the reference beacon transmitter 110 at a particular time, which time is also included in the message. Error correction coding and other information, described more fully below, may also be included.

The reference beacon signal 115 is received by a plurality of collection platforms 121-123 which are in communication with and operate in conjunction with a geolocation processing system 130. The collection platforms 121-123 can be conventional. Although three collection platforms 121-123 are shown in FIG. 1, as can be appreciated by one of ordinary skill in the art, two or more collection platforms can be used for geolocation depending on the particular implementation.

The geolocation processing system 130 includes a reference correction processing sub-system or function 135 (also referred to as reference correction processor 135). The reference correction processor 135 may be implemented as part of the geolocation processing system 130 or as a separate element.

In conjunction with the collection platforms 121-123, the geolocation processing system 130 operates in accordance with conventional TDOA/FDOA techniques to estimate the location and/or velocity of various emitters, including non-cooperative emitters as well as reference beacons. As described below, the reference correction processor 135 uses the information contained in the signals received from the reference beacon transmitter 110 to estimate TDOA/FDOA bias errors that can be used to improve the geolocation processing system's 130 estimates of emitter location and/or velocity.

It should be noted that the TDOA/FDOA bias errors can be estimated in terms of position and motion or in terms of time and frequency. In other words, the reference correction processor 135 can preferably generate at least one of two types of correction. The first is a position/motion error correction: e.g., "all computed 2D geolocations should be corrected by −100 m east and +300 m north." The second is a correction to the TDOA (and/or FDOA) measurements that are used to perform the geolocation: e.g., "all TDOA and FDOA measurements between collection platforms A & B should be corrected by +25.4 ms and +0.0043 Hz." Such a correction can be determined by computing the "true" TDOA/FDOA measurements that would be expected based on the known transmitter and receiver positions (and velocities) and comparing to the "measured" TDOA/FDOA values.

After reception, the information contained in the reference beacon signal 115 may be extracted by the collection platforms 121-123 and communicated to the geolocation processing system 130 and/or reference correction processor 135. Alternatively, the received signal 115 may be conveyed by the collection platforms 121-123 to the geolocation processing system 130 and/or reference correction processor 135 which then extract(s) the relevant contents. In either case, the reference correction processor 135 obtains, by way of the collection platforms 121-123, the information in the messages transmitted by the reference beacon transmitter 110. As such, no other link between the reference correction processor 135 and the reference beacon transmitter 110 is required.

The position and/or velocity estimates generated by the geolocation processing system 130 and the position and/or motion information contained in the received reference beacon signal 115 are used by the reference correction processor 135 to estimate a measurement bias error. The estimated measurement bias error can then be used to improve the estimated position and/or velocity of other emitters.

As mentioned, in an exemplary embodiment of the present invention, the position and/or velocity of the reference beacon transmitter 110 at some future time is predicted and transmitted in the reference beacon signal. Previous values of position and motion (velocity and/or acceleration) can be used to predict the position and/or velocity of the transmitter 110 at a future time of interest. The future time of interest can be the time of transmission of the message containing the predicted information.

In an alternative exemplary embodiment, the reference beacon transmitter 110 transmits a message containing its last known position, velocity, and, if available, acceleration, and the time at which those parameters were determined (i.e., "time of fix"). The reference correction processor 135 could then use the received information to estimate the position and/or velocity of the reference beacon transmitter 110 at the time of transmission of the message containing said information.

To allow for the possibility that demodulation and decoding errors may occur while demodulating the signal, the reference beacon transmitter 110 may add additional data to the position message before modulation and transmission. Such additional data may include error correction codes, for example.

Additional information, such as the identity of the reference beacon transmitter 110 could also be added to a message.

Figure 2:
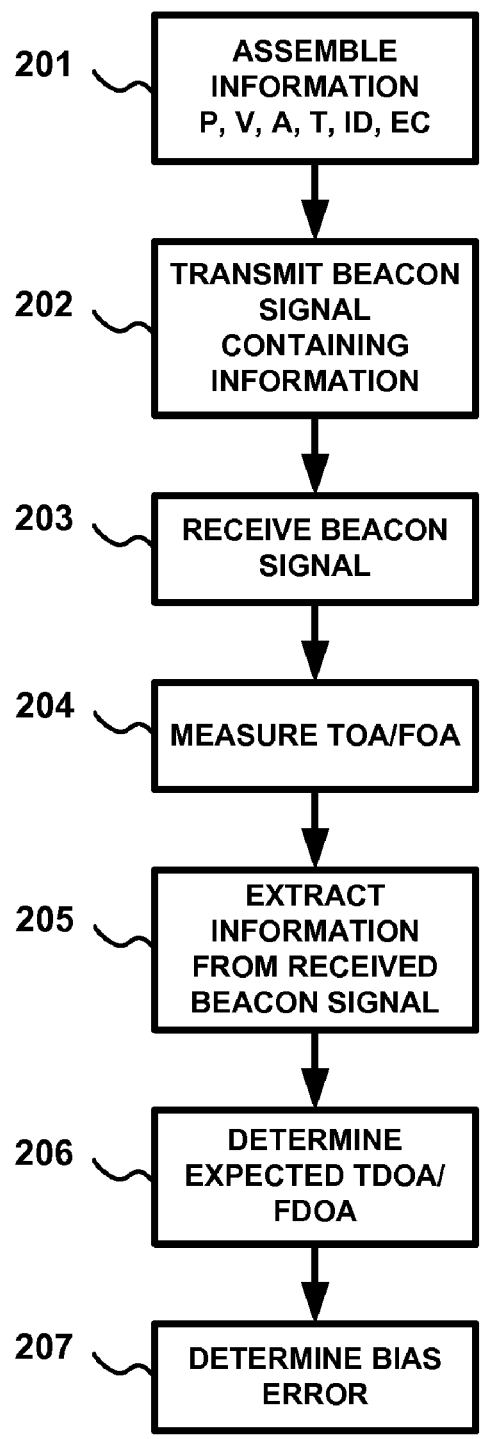
FIG. 2 is a flow-chart illustrating an exemplary embodiment of a method in accordance with the present invention.

FIG. 2 shows a flow-chart summarizing the steps in an exemplary embodiment of a method in accordance with the present invention. At step 201, the information to be contained in the reference beacon signal is assembled, and may include, as discussed above, the transmitter position (P), velocity (V), and acceleration (A), time of fix (T) of the position and/or motion information, transmitter identification (ID), and error correction (EC) information, for example. At step 202, the beacon signal containing said information is transmitted and received by the geolocation system at step 203. Time of arrival and/or frequency of arrival at the collection platforms of the geolocation system is measured at step 204. The information embedded in the received reference beacon signal is then extracted at step 205. Based on the extracted information, the geolocation system, at step 206, determines the TDOA/FDOA measurements that would be expected at the receiving collection platforms. The bias error is then determined at step 207 based on the expected TDOA/FDOA measurements and the actual measurements made at step 204. The bias error may include a timing bias error and/or a frequency bias error, as described above.

Figure 3:
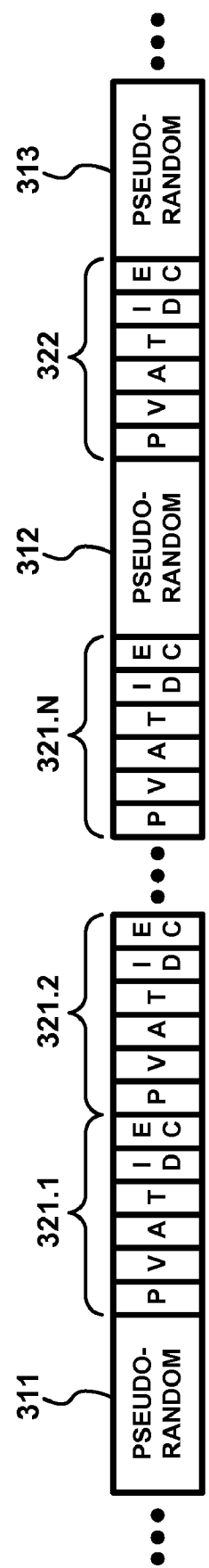
FIG. 3 is an exemplary format of information encoded into a reference beacon signal in accordance with the present invention.

FIG. 3 shows an exemplary arrangement of information in a reference beacon signal generated in accordance with the present invention. Information elements 321.1-321.N and 322 each contain position (P), velocity (V), acceleration (A), time of fix (T) and identification (ID) information for the reference beacon transmitter from which they are transmitted. Error correction (EC) information is also included in the aforementioned information elements. Error correction information can be included in each information element or for a group of information elements.

To allow for the possibility that a portion of the transmitted waveform may not be properly received, or may be corrupted, the reference beacon transmitter position and/or motion information may be transmitted multiple times in the beacon signal. Referring to FIG. 3, the information elements 321.1-321.N may all contain the same information. The duplicate information elements may be contiguous (e.g., 321.1-321.N) or may be separated by periods of pseudo-random waveforms. Thus, for example, the information element 322 may contain the same information as information elements 321.1-321.N but is separated therefrom by a pseudo-random waveform period 312. An information element 321, 322 may be transmitted one or more times between intervening pseudo-random waveform periods 311-313.

Any of a variety of encoding or modulation schemes can be used to embed the reference beacon information in the reference beacon signal including, for example, pulse amplitude modulation (PAM), frequency shift keying (FSK), or phase shift keying (PSK), among others.

Once received, the reference beacon signal can be demodulated, decoded and otherwise processed by the collection platforms 121-123 and/or the geolocation processing system 130. Conventional TDOA/FDOA signal collection systems, however, do not typically demodulate or decode the RF signals that they capture. Rather, conventional collection platforms will generate RF signal data, typically raw, digitized sample data of the captured RF signals. The RF signal data may be digitally filtered, resampled, or re-tuned, but there is typically no detection or demodulation processing performed on the data samples by the collection platforms 121-123. Instead, the digitized RF data is sent directly to the geolocation processor where the RF waveforms are correlated to produce TDOA/FDOA measurements. This allows the reference beacon signal to be demodulated by the geolocation processing system, rather than the signal collectors.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of determining bias error in a geolocation system, comprising:
   transmitting from a transmitter a reference beacon signal containing position information including at least one of a position of the transmitter at a time of fix and an estimate of the position of the transmitter at a time of transmission of the reference beacon signal, wherein the reference beacon signal contains motion information relating to the transmitter;
   receiving the reference beacon signal at a plurality of collection platforms;
   determining a position measurement of the transmitter based on at least one of a time of arrival and a frequency of arrival of the reference beacon signal at the plurality of collection platforms;
   determining a first bias error based on the position measurement of the transmitter and the position information contained in the reference beacon signal;
   determining a velocity measurement of the transmitter based on a frequency of arrival of the reference beacon signal at each of the plurality of collection platforms; and
   determining a second bias error based on the velocity measurement of the transmitter and the motion information contained in the reference beacon signal.

2. The method of claim 1, wherein the reference beacon signal further contains the time of fix.

3. The method of claim 1, wherein the motion information includes at least one of a velocity and an acceleration of the transmitter.

4. The method of claim 1, wherein the reference beacon signal contains information identifying the transmitter.

5. The method of claim 1, wherein the reference beacon signal contains error correction information.

6. The method of claim 1, wherein the position information is contained in an information element encoded in the reference beacon signal.

7. The method of claim 6, wherein the information element is transmitted two or more times.

8. The method of claim 7, wherein a pseudo-random waveform is transmitted between the transmissions of the information element.

9. The method of claim 1, wherein the first bias error includes a position measurement error.

10. The method of claim 1, wherein the second bias error includes a velocity measurement error.

11. The method of claim 1, wherein the position of the transmitter can vary with time.

12. The method of claim 1, wherein the motion information includes an estimate of a motion of the transmitter at a time of transmission of the reference beacon signal.

13. The method of claim 1, wherein the motion information includes a motion of the transmitter at a time of fix and the reference beacon signal further contains the time of fix.

14. The method of claim 1, wherein the motion information is contained in an information element encoded in the reference beacon signal.

15. The method of claim 14, wherein the information element is transmitted two or more times.

16. The method of claim 1 comprising:
    embedding at least one of the position information and the motion information in the reference beacon signal.

17. A method of determining bias error in a geolocation system, comprising:
    transmitting from a transmitter a reference beacon signal containing position information including at least one of a position of the transmitter at a time of fix and an estimate of the position of the transmitter at a time of transmission of the reference beacon signal;
    receiving the reference beacon signal at a plurality of collection platforms;
    determining a position measurement of the transmitter based on at least one of a time of arrival and a frequency of arrival of the reference beacon signal at the plurality of collection platforms;
    determining a first bias error based on the position measurement of the transmitter and the position information contained in the reference beacon signal;
    measuring a time of arrival of the reference beacon signal at each of the plurality of collection platforms;
    determining an expected difference between the times of arrival of the reference beacon signal at two of the plurality of collection platforms based on the position information contained in the reference beacon signal; and
    determining a timing bias error based on the measured times of arrival of the reference beacon signal at the two collection platforms and the expected difference between the times of arrival of the reference beacon signal at the two collection platforms.

18. The method of claim 17, wherein the reference beacon signal contains information identifying the transmitter.

19. The method of claim 17, wherein the reference beacon signal contains error correction information.

20. The method of claim 17, wherein the first bias error includes a position measurement error.

21. The method of claim 17, wherein the position information is contained in an information element encoded in the reference beacon signal.

22. The method of claim 21, wherein a pseudo-random waveform is transmitted between the transmissions of the information element.

23. The method of claim 17, comprising:
embedding the position information in the reference beacon signal.

24. A method of determining bias error in a geolocation system, comprising:
transmitting from a transmitter a reference beacon signal containing position information including at least one of a position of the transmitter at a time of fix and an estimate of the position of the transmitter at a time of transmission of the reference beacon signal, wherein the reference beacon signal contains motion information relating to the transmitter;
receiving the reference beacon signal at a plurality of collection platforms;
determining a position measurement of the transmitter based on at least one of a time of arrival and a frequency of arrival of the reference beacon signal at the plurality of collection platforms;
determining a first bias error based on the position measurement of the transmitter and the position information contained in the reference beacon signal;
measuring a frequency of arrival of the reference beacon signal at each of the plurality of collection platforms;
determining an expected frequency difference of arrival of the reference beacon signal at the plurality of collection platforms based on the motion information contained in the reference beacon signal; and
determining a frequency bias error based on the measured frequency of arrival of the reference beacon signal at each of the plurality of collection platforms and the expected frequency difference of arrival of the reference beacon signal at the plurality of collection platforms.

25. The method of claim 24, wherein the reference beacon signal further contains the time of fix.

26. The method of claim 24, wherein the reference beacon signal contains error correction information.

27. The method of claim 24, wherein the first bias error included a position measurement error.

28. The method of claim 27, wherein pseudo-random waveform is transmitted between the transmissions of the information element.

29. The method of claim 24, wherein the position of the transmitter can vary with time.

30. The method of claim 24, wherein the motion information includes a motion of the transmitter at a time of fix and the reference beacon signal further contains the time of fix.

31. The method of claim 24, wherein the motion information is contained in an information element encoded in the reference beacon signal.

32. The method of claim 24 comprising:
embedding at least one of the position information and the motion information in the reference beacon signal.

33. A method of determining bias error in a geolocation system, comprising:
transmitting from a transmitter a reference beacon signal containing position information including at least one of a position of the transmitter at a time of fix and an estimate of the position of the transmitter at a time of transmission of the reference beacon signal;
receiving the reference beacon signal at a plurality of collection platforms;
determining a position measurement of the transmitter based on at least one of a time of arrival and a frequency of arrival of the reference beacon signal at the plurality of collection platforms
determining a first bias error based on the position measurement of the transmitter and the position information contained in the reference beacon signal;
measuring a frequency of arrival of the reference beacon signal at each of the plurality of collection platforms;
determining an expected frequency difference of arrival of the reference beacon signal at the plurality of collection platforms based on the position information contained in the reference beacon signal; and
determining a frequency bias error based on the measured frequency of arrival of the reference beacon signal at each of the plurality of collection platforms and the expected frequency difference of arrival of the reference beacon signal at the plurality of collection platforms.

34. The method of claim 33, wherein the reference beacon signal contains information identifying the transmitter.

35. The method of claim 33, wherein the position information is contained in an information element encoded in the reference beacon signal.

36. The method of claim 33, wherein the position of the transmitter can vary with time.

37. The method of claim 33 comprising:
embedding the position information in the reference beacon signal.

* * * * *